US008300736B2

United States Patent
Kim et al.

(10) Patent No.: US 8,300,736 B2
(45) Date of Patent: Oct. 30, 2012

(54) METHOD AND APPARATUS FOR PHASE REFERENCE TRACKING OF DIGITAL PHASE MODULATED SIGNALS IN THE RECEIVER

(75) Inventors: Pansop Kim, Torrance, CA (US); Jeng-Hong Chen, Temple City, CA (US); Hsin-Hsiang Liu, Torrance, CA (US)

(73) Assignee: ISSC Technologies Corp., Hsinchu (TW)

( * ) Notice: Subject to any disclaimer, the term of this patent is extended or adjusted under 35 U.S.C. 154(b) by 422 days.

(21) Appl. No.: 12/581,607

(22) Filed: Oct. 19, 2009

(65) Prior Publication Data

US 2011/0090991 A1    Apr. 21, 2011

(51) Int. Cl.
    *H04L 27/00*  (2006.01)
(52) U.S. Cl. ...................................................... 375/324
(58) Field of Classification Search .......... 375/324–325, 375/327, 340, 373
    See application file for complete search history.

(56) References Cited

U.S. PATENT DOCUMENTS

| | | | | |
|---|---|---|---|---|
| 6,236,687 B1 * | 5/2001 | Caso et al. | ..................... | 375/327 |
| 6,603,349 B2 * | 8/2003 | Carrozza et al. | ............. | 329/304 |
| 6,956,924 B2 * | 10/2005 | Linsky et al. | ................. | 375/376 |
| 7,245,672 B2 * | 7/2007 | Smit | ............................. | 375/330 |
| 7,397,871 B2 | 7/2008 | Wiss et al. | | |
| 7,415,078 B2 | 8/2008 | Smit | | |
| 8,050,366 B2 * | 11/2011 | Lin et al. | ........................ | 375/344 |
| 2007/0223393 A1 | 9/2007 | Urushihara et al. | | |

OTHER PUBLICATIONS

Park et al., "Specificationof the Bluetooth System", Versin 2.0 + EDR, Nov. 4, 2004, pp. 1-1230, vols. 0-4.
Divsalar, et al. "Multiple-Symbol Differential Detection of MPSK", IEEE Transactions on Communications, vol. 38, No. 3, Mar. 1990, pp. 300-308.

* cited by examiner

*Primary Examiner* — Khanh C Tran
(74) *Attorney, Agent, or Firm* — Birch, Stewart, Kolasch & Birch, LLP

(57) ABSTRACT

The present invention discloses a method and apparatus to provide, effectively and robustly, a phase reference in phase-domain for digital phase-modulated signals. Not only the first-order but also higher order PLLs are delineated for robust and fast tracking of frequency errors and time-varying frequency errors between the transmitter and the receiver. This invention can be applied to any phase-modulated signal such as PSK, DPSK, π/4-DPSK, and CPM. The decoders with this invention can achieve close to the performance of coherent detection.

Reference
[1] D. Divsalar and M. K. Simon, "Multiple-symbols differential detection of MPSK," *IEEE Trans. Commun.*, vol. 38, pp. 300-308, March 1990.
[2] Specification of the Bluetooth System, 2.0+EDR, 4 Nov. 2004.

24 Claims, 5 Drawing Sheets

Proposed receiver for phase-modulated signals

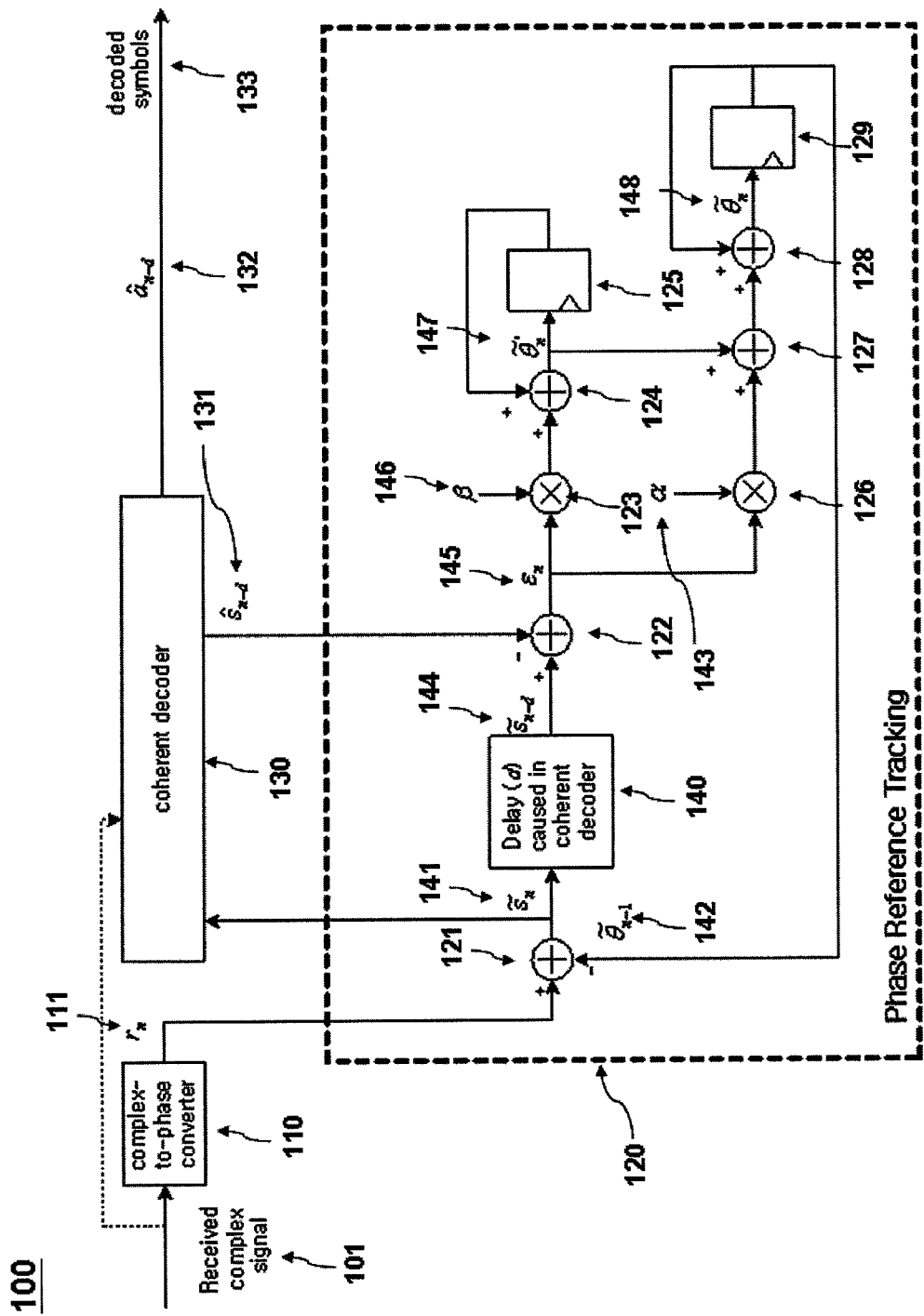
FIG. 1 Proposed receiver for phase-modulated signals

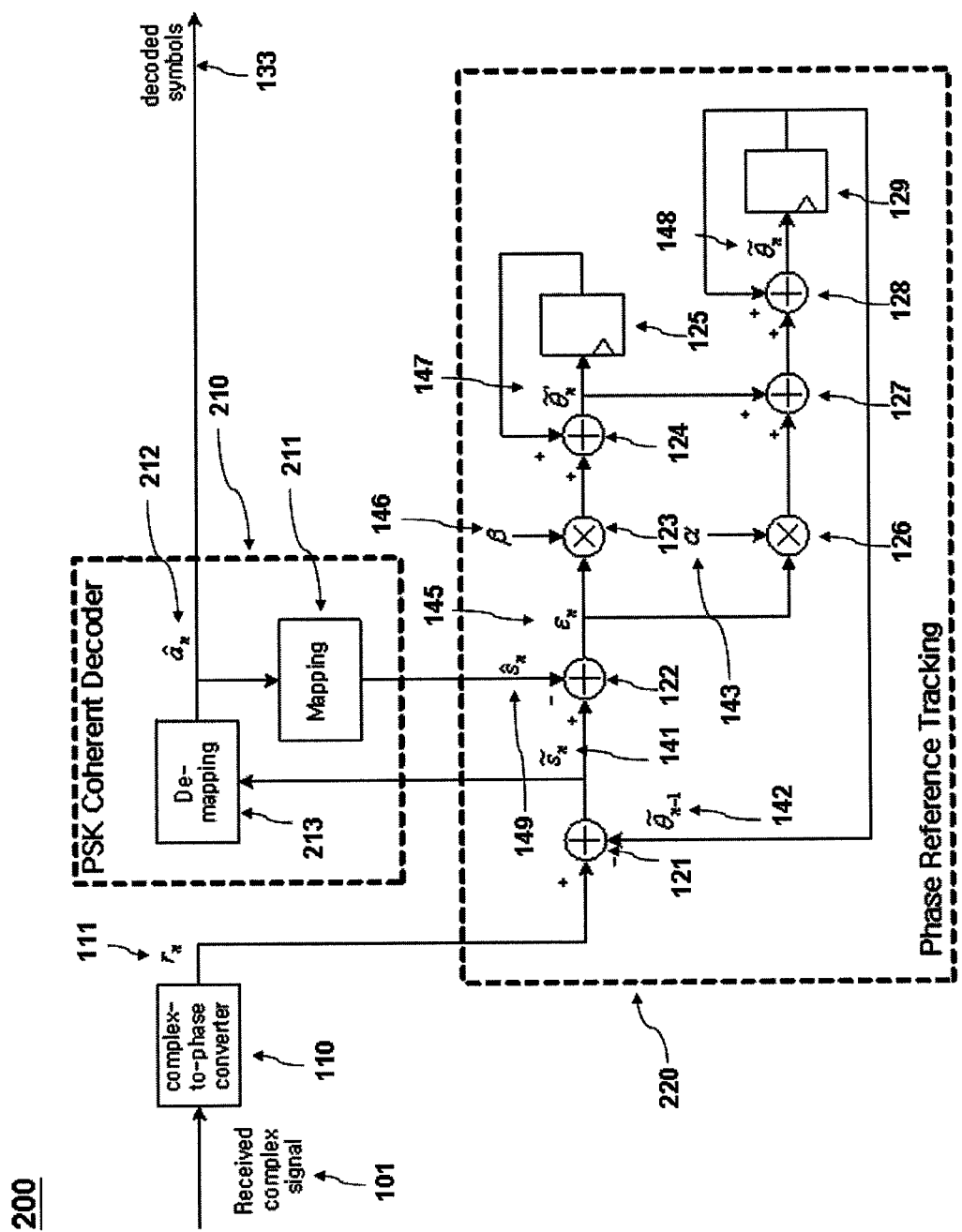
FIG. 2 Proposed PSK receiver

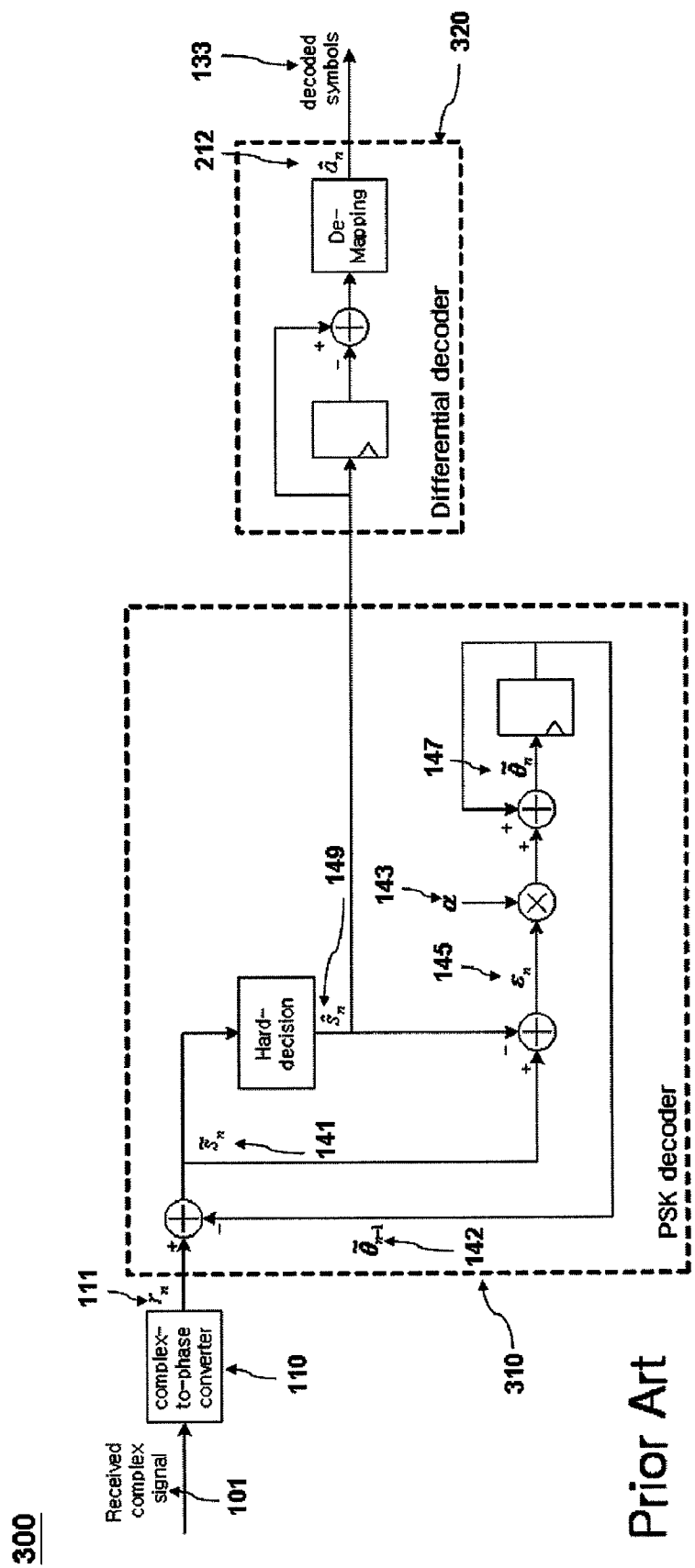
FIG. 3 Smit's DPSK receiver
Prior Art

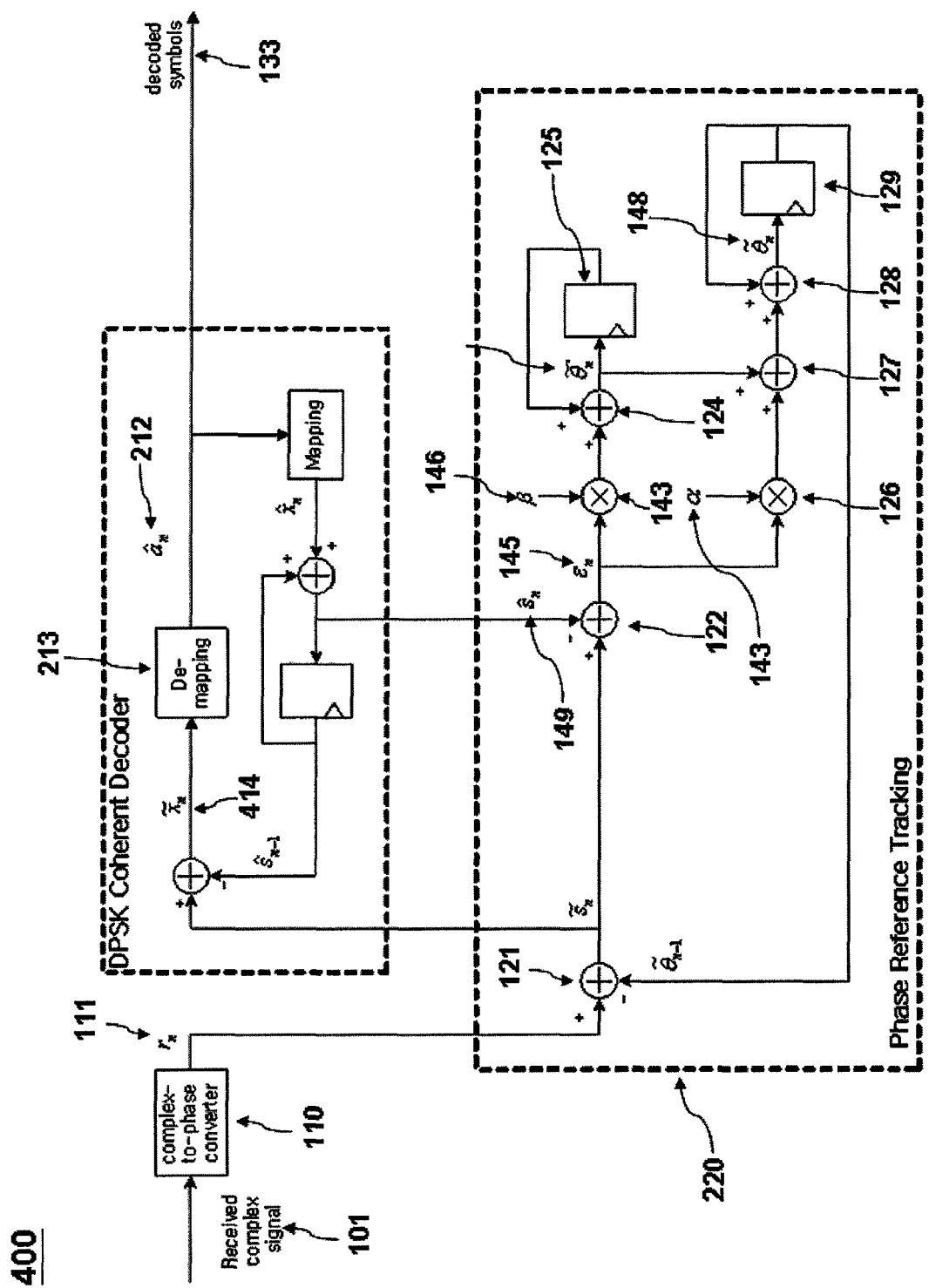
FIG. 4 Proposed DPSK receiver

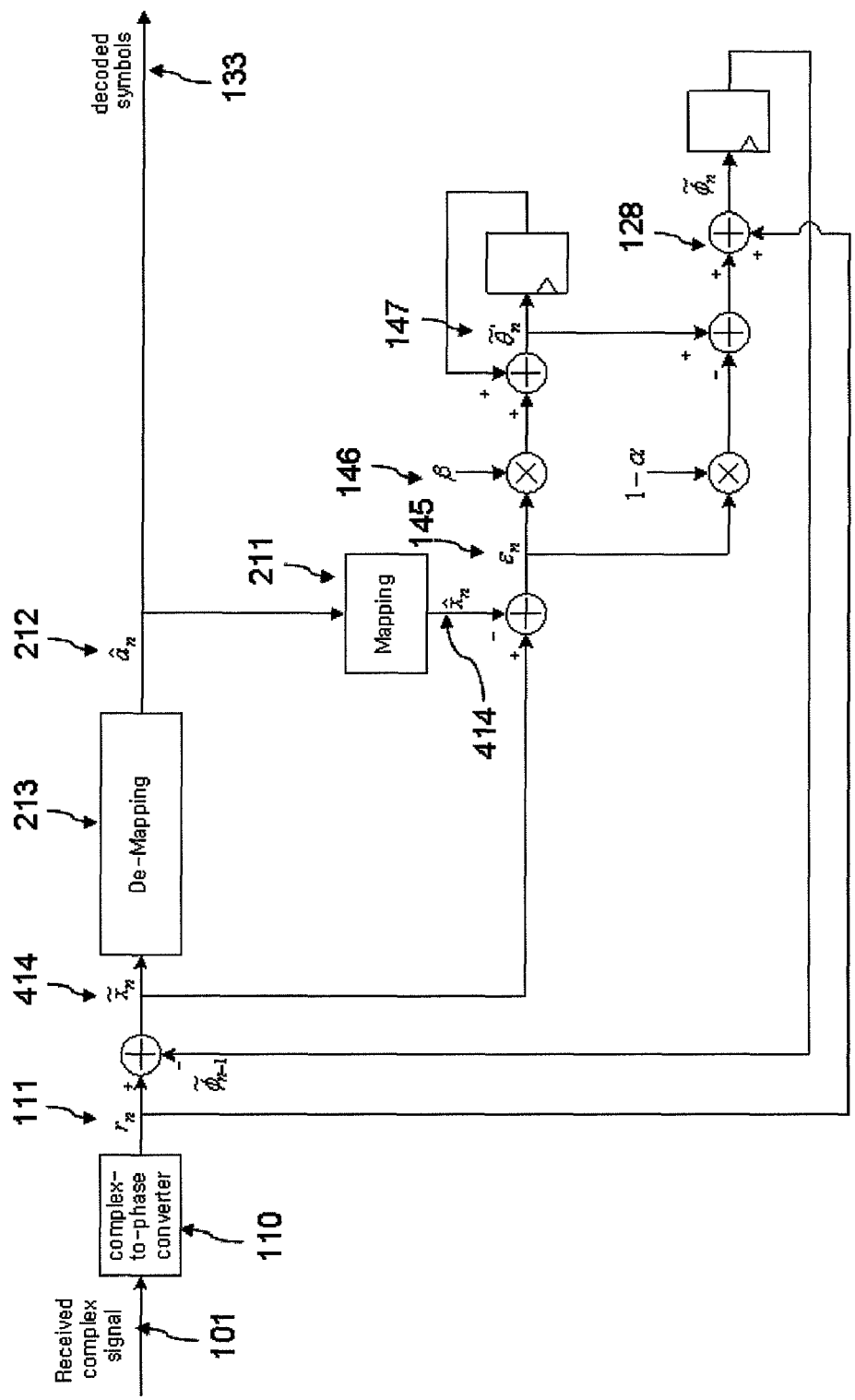
FIG. 5 Alternative implementation for the proposed DPSK receiver

METHOD AND APPARATUS FOR PHASE REFERENCE TRACKING OF DIGITAL PHASE MODULATED SIGNALS IN THE RECEIVER

BACKGROUND OF THE INVENTION

1. Field of the Invention

The present invention relates generally to digital communication systems, and more particularly to a methods and apparatus for phase reference tracking of digital phase modulated signals in the receiver.

2. Background

Digital phase modulation is one of the popular digital modulations due to its simplicity and robustness. Source information is transmitted by selecting phases of the signal according to the information bits. Continuous phase modulation (CPM), Phase-shift keying (PSK) and differential phase-shift keying (DPSK) are examples of digital phase modulation.

In the receiver, it is necessary to detect an accurate phase reference for decoding the transmitted information bits. Otherwise, phase reference errors may cause significant performance degradation. For differentially encoded digital phase modulations such as DPSK, DQPSK and D8PSK, a phase reference can be derived from the previous symbol to facilitate the demodulation. For simple receivers, DPSK signals may be differentially decoded. That means, previous phase is used as a reference for the current symbol. However, since this reference is noisy, the performance can degrade up to 3 dB, compared to the performance with perfect phase reference. Phase reference tracking is also useful for DPSK signals.

To facilitate such a phase reference estimate, a training sequence is often transmitted at the beginning of a data packet. The phase reference may be easily estimated with the training sequence known at the receiver, but the throughput may be slightly decreased as the training sequence does not contain source information. Moreover, the phase reference may be time-varying due to the imperfect oscillators at the transmitter (TX) or the receiver (RX). In this case, phase reference tracking will be necessary for the receiver to maintain best performance while receiving information bits. Phase references may be heavily time-varying due to the mismatching between TX and RX oscillators. This mismatching is so-called frequency offset (FO). Moreover frequency drift may cause difficulty in tracking accurate phase reference. By estimating and/or tracking this FO, phase reference may be kept accurate.

For this phase reference tracking, multiple symbol detection [1] based on maximum likelihood sequence detection (MLSD) was proposed, but its complexity exponentially increases with the number of observation symbols. Furthermore, U.S. Pat. No. 7,245,672 issued to Smit et al., entitled "Method and apparatus for phase-domain semi-coherent demodulation" disclosed that a first-order IIR filter in phase-domain, of which complexity further decreases due to the phase operations instead of the complex signal operations as shown in FIG. 3, However, this first order phase tracking is not sufficient to handle heavy phase variations. For example, Bluetooth spec [2] allows frequency to drift up to 400 Hz/μs. Also, double errors (decoded symbol error propagation) are un-avoidable in this invention due to the proposed differential decoding.

According to above problems, the related field needs a simple and robust phase tracking method, where the phase reference is tracked in phase-domain with a high order digital phase-locked loop, for general phase-modulated signals. Also, related field suggests a better way to track phase for differentially encoded digital phase modulations, such as DBPSK, (π/4) DQPSK and DBPSK modulated signals.

BRIEF SUMMARY OF THE INVENTION

It is an objective of the present invention to provide an effective and robust method for phase reference tracking of digital phase modulated signals in the receiver. It tracks the phase errors and generates reliable phase reference to estimate.

To achieve the above objective, the present invention provides a method used for phase reference tracking of digital phase modulated signals in the receiver, comprising the steps of: converting a received complex signal to the received phase $r_n$, feeding the received phase $r_n$ to a phase reference tracking unit, producing an estimated transmit phase $\tilde{s}_n$ from the phase reference tracking unit, feeding the estimated transmit phase $\tilde{s}_n$ to a coherent decoder, and producing a decoded symbol $\hat{a}_n$ from the coherent decoder.

According to one aspect of the present invention, the received complex signal can be encoded by BPSK, MPSK, PSK and DPSK modulation systems.

According to one aspect of the present invention, the received phase $r_n$ can be converted to different forms according the received complex signal.

Another objective of the present invention is to provide an effective and robust apparatus for phase reference tracking of digital phase modulated signals in the receiver. The phase reference tracking unit takes the received phase and the decoded symbols as its input, generates reliable phase reference to estimate by tracking phase errors due to frequency offset and the variation of frequency offset. A gradient algorithm in phase-domain based on the measured phase error is utilized in the phase reference tracking unit.

To achieve the above objective, the present invention provides an apparatus used for phase reference tracking of digital phase modulated signals in the receiver, comprising: a complex-to-phase converter, used for converting the in-phase ($I_n$) and the quadrature ($Q_n$) components of a received complex signal to a received phase $r_n$, the phase reference tracking unit, which is electrically connected to the complex-to-phase converter, used for producing an estimated transmit phase $\tilde{s}_n$, and the coherent decoder, which is electrically connected to the phase reference tracking unit, used for producing a decoded symbol $\hat{a}_n$ and sending a re-modulation phase signal $\hat{s}_n$ to the phase reference tracking unit.

According to one aspect of the present invention, the apparatus used for phase reference tracking of digital phase modulated signals in the receiver can be applied in BPSK, MPSK, PSK and DPSK modulation systems.

According to one aspect of the present invention, the types of the coherent decoder can be selected according to BPSK, MPSK and DPSK modulation systems.

BRIEF DESCRIPTION OF THE DRAWINGS

All the objects, advantages, and novel features of the invention will become more apparent from the following detailed descriptions when taken in conjunction with the accompanying drawings.

FIG. 1 is a block diagram for a general decoder and the invented phase reference tracking;

FIG. 2 is a block diagram for the PSK decoder and the invented phase reference tracking;

FIG. 3 is a DPSK receiver block diagram proposed by Smit (Prior Art);

FIG. 4 is a block diagram for a DPSK decoder and the invented phase reference tracking; and FIG. 5 is an alternative block diagram for a DPSK decoder and the invented phase reference tracking.

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Phase reference tracking is not necessary for some phase-modulated signals such as Gaussian frequency shift-keying (GFSK) and DPSK. However, it is well-known that coherent detection may help to improve performances up to 3 dB. Here, a simple, robust and generalized method for phase reference tracking in phase-domain is provided.

To understand the spirit of the present invention, referring to FIG. 1, it shows the block diagram for a general decoder and the invented phase reference tracking. An apparatus for phase reference tracking of digital phase modulated signals in the receiver 100 comprises a complex-to-phase converter 110, a phase reference tracking unit 120, a coherent decoder 130. The complex-to-phase converter 110 is used for converting the in-phase ($I_n$) and the quadrature ($Q_n$) components of a received complex signal 101 to a received phase $r_n$ 111. The phase reference tracking unit 120, which is electrically connected to the complex-to-phase converter 110, is used for producing an estimated transmit phase $\tilde{s}_n$ 141. The coherent decoder 130, which is electrically connected to the phase reference tracking unit 120, is used for producing a decoded symbol $â_n$ 212 and sending a re-modulation phase signal $ŝ_n$ 149 to the phase reference tracking unit 120.

The apparatus used for phase reference tracking of digital phase modulated signals in the receiver can be applied in BPSK, MPSK, PSK and DPSK modulation systems. The received complex signal 101 can be encoded by BPSK, MPSK, PSK and DPSK modulation systems. The received phase $r_n$ 111 can be converted to different forms according to the received complex signal 101. The types of the coherent decoder 130 can be selected according to BPSK, MPSK and DPSK modulation systems.

Now, referring to FIG. 1, the phase reference tracking unit further comprises a first subtracter 121, a second subtracter 122, a first multiplier 123, a first adder 124, a first sample delay unit 125, a second multiplier 126, a second adder 127, a third adder 128, and a second sample delay unit 129. The first subtracter 121 is used for subtracting the previous phase reference estimate $\tilde{\theta}_{n-1}$ 142 from the received phase $r_n$ 111 and producing the estimated transmit phase $\tilde{s}_n$ 141. The second subtracter 122, which is electrically connected to the coherent decoder 130, is used for subtracting the re-modulation phase signal $ŝ_{n-d}$ 131 from the estimated transmit phase $\tilde{s}_n$ 141 and producing a tracking error $\epsilon_n$ 145. The first multiplier 146, which is electrically connected to the second subtracter 122, is used for scaling the tracking error $\epsilon_n$ 145 by a value of $\beta$ 146. The first adder 124, which is electrically connected to the first multiplier 123, is used for adding a scaled tracking error $\beta\epsilon_n$ and a previous phase correction factor $\tilde{\theta}'_{n-1}$. The first sample delay unit 125, which is electrically connected to the first adder 124, is used for taking the phase correction factor $\tilde{\theta}'_n$ 147 to the previous state of $\tilde{\theta}'_{n-1}$ and providing a feedback signal of previous phase correction factor $\tilde{\theta}'_{n-1}$ to the first adder 124. The second multiplier 126, which is electrically connected to the second subtracter 122, is used for scaling the tracking error $\epsilon_n$ 145 by a value of $\alpha$ 143. The second adder 127, which is electrically connected to the second multiplier 126, is used for adding a scaled tracking error $\alpha\epsilon_n$ and the phase correction factor $\tilde{\theta}'_n$ 147. The third adder 128, which is electrically connected to the second adder 127, is used for adding the previous phase reference estimate $\tilde{\theta}_{n-1}$, the scaled tracking error $\alpha\epsilon_n$ and the phase correction factor $\tilde{\theta}'_n$ 147. The second sample delay unit 129, which is electrically connected to the second adder, is used for the taking the phase reference estimate $\tilde{\theta}_n$ 147 to the previous state $\tilde{\theta}_{n-1}$ and providing a feedback signal of previous reference estimate $\tilde{\theta}_{n-1}$ to the third adder 128 and the first subtracter 121.

Moreover, to compensate the delay (d) caused in the coherent decoder and to generate the estimated transmit phase $\tilde{s}_n$ 149 with correct timing, a coherent decoder 140, which is electrically connected to the first subtracter 121, is provided. Therefore, the estimated transmit phase $\tilde{s}_n$ 149 and the decoded symbol $â_n$ 212 turn into a estimated transmit phase with a delay (d) $\tilde{s}_{n-d}$ 144 and decoded symbol with a delay (d) $â_{n-d}$ 132 which are also denoted as decoded symbols 133.

The construction of the block diagram of the apparatus according the present invention may be modified and/or simplified with combining the phase reference tracking units and the coherent decoder units by removing redundant units and/or re-organizing the block diagrams.

Besides, the procedure of the present invention can further described as the following steps:

Step1: converting a received complex signal to the received phase $r_n$ 111;

Step2: feeding the received phase $r_n$ 111 to a phase reference tracking unit;

Step3: producing an estimated transmit phase $ŝ_n$ 141 from the phase reference tracking unit;

Step4: feeding the estimated transmit phase $\tilde{s}_n$ 141 to a coherent decoder; and Step5: producing a decoded symbol $â_n$ 212 from the coherent decoder.

The received complex signal can be encoded by BPSK, MPSK, PSK and DPSK modulation systems. The received phase $r_n$ 111 can be converted to different forms according to the received complex signal.

Moreover, the procedure of producing an estimated transmit phase $\tilde{s}_n$ 141 further comprising the steps of:

Step1: subtracting a previous phase reference estimate $\tilde{\theta}_{n-1}$ 142 from a received phase $r_n$ 111;

Step2: producing a tracking error $\epsilon_n$ 145 by subtracting a re-modulation phase signal $ŝ_n$ 149 from an estimated transmit phase $\tilde{s}_n$ 141;

Step3: scaling the tracking error $\epsilon_n$ 145 by a value of $\beta$ 146;

Step4: adding the scaled of tracking error $\beta\epsilon_n$ with a previous phase correction factor $\tilde{\theta}'_{n-1}$ and derive a phase correction factor $\tilde{\theta}'_n$;

Step5: scaling the tracking error $\epsilon_n$ 145 by a value of $\alpha$ 143;

Step6: adding the scaled of tracking error $\alpha\epsilon_n$ with the phase correction factor $\tilde{\theta}'_n$; and Step7: adding the scaled of tracking error $\alpha\epsilon_n$ with the phase correction factor $\tilde{\theta}'_n$ with the previous phase reference estimate $\tilde{\theta}_{n-1}$ and derive the phase reference estimate $\tilde{\theta}_n$ 148.

The procedure of producing an estimated transmit phase $\tilde{s}_n$ further comprising the steps of:

Step1: subtracting a previous phase reference estimate $\tilde{\theta}_{n-1}$ from a received phase $r_n$ 111;

Step2: adding a delay (d) to an estimated transmit phase $\tilde{s}_n$ 141;

Step3: producing a tracking error $\epsilon_n$ 145 by subtracting a re-modulation phase with a delay (d)$\hat{s}_{n-d}$ 131 from a re-modulation phase with a delay (d)$\tilde{s}_{n-d}$ 131;

Step4: scaling the tracking error $\epsilon_n$ by a value of $\beta$;

Step5: adding the scaled of tracking error $\beta\epsilon_n$ with a previous phase correction factor $\tilde{\theta}'_{n-1}$ and derive a phase correction factor $\tilde{\theta}'_n$;

Step6: scaling the tracking error $\epsilon_n$ 145 by a value of $\alpha$ 143;

Step7: adding the scaled of tracking error $\alpha\epsilon_n$ with the phase correction factor $\tilde{\theta}'_n$; and Step8: adding the scaled of tracking error $\alpha\epsilon_n$ with the phase correction factor $\tilde{\theta}'_n$ with the previous phase reference estimate $\tilde{\theta}_{n-1}$ and derive the phase reference estimate $\tilde{\theta}_n$ 148.

The delay (d) is used for generating the estimated transmit phase $\tilde{s}_n$ 141 with correct timing.

The procedure of producing a decoded symbol $\hat{a}_n$ 212 further comprising the steps of:

Step1: feeding an estimated transmit phase $\tilde{s}_n$ 141 to a coherent decoder;

Step2: de-mapping the estimated transmit phase $\tilde{s}_n$ 141;

Step3: producing a decoded symbol $\hat{a}_n$ 212;

Step4: mapping the decoded symbol $\hat{a}_n$ 212; and

Step5: producing a re-modulation phase signal $\hat{s}_n$ 141;

The re-modulation phase signal $\hat{s}_n$ 141 is feed to a phase reference tracking unit and used for the calculation of a tracking error $\epsilon_n$ 145. The method used for phase reference tracking of digital phase modulated signals in the receiver as described above, the method is generalized with n-th order tracking.

A complex-to-phase converter 110 converts the incoming received complex signal 101, consisting of the in-phase ($I_n$) and the quadrature ($Q_n$) components, to a received phase $r_n$ 111 using the following equation:

$$r_n = \tan^{-1}\left(\frac{Q_n}{I_n}\right), \quad \text{Eq. (1)}$$

where n represents the symbol time index. Note that the operations on phase are based on modular $2\pi$. The received phase $r_n$ 111 can be converted to different forms according the received complex signal and also can be converted to different forms according the received complex signal 101.

This received phase $r_n$ 111 is fed to a phase reference tracking unit 120, which produces an estimated transmit phase $\tilde{s}_n$ 141. This estimated transmit phase $\tilde{s}_n$ 141 is an estimated transmit phase and is fed to a coherent decoder 130. Since the allowed transmit phase is quantized for a digital phase modulation, the coherent decoder 130 decodes the estimated transmit phase $\tilde{s}_n$ 141 based on a de-mapping table to produce the decoded symbol with a delay (d) $\hat{a}_{n-d}$ 132. For example, the coherent decoder 130 decodes for BPSK can be found in TABLE 1 below. If required, the coherent decoder 130 may utilize the received complex signal 101. The coherent decoder 130 also uses a "mapping" table to reconstruct the phase (also known as re-modulation) for the decoded symbol $\hat{a}_n$ 132, denoted $\hat{s}_{n-d}$ 131, and sends it to the phase reference tracking unit 120. An example for the mapping table for BPSK modulated signal is shown in Table 2 below.

TABLE 1

De-Mapping Table for BPSK

| $\tilde{s}_n$ | Decoded Symbol |
|---|---|
| $-\pi/2 < \tilde{s}_n < \pi/2$ | 0 |
| Otherwise | 1 |

TABLE 2

Mapping Table for BPSK

| Decoded Symbol | Re-modulated Phase |
|---|---|
| 0 | 0 |
| 1 | $\pi$ |

Inside the phase reference tracking unit 120, the estimated transmit phase $\tilde{s}_n$ 141 at the receiver is calculated by subtracting the previous phase reference estimate $\tilde{\theta}_{n-1}$ 142 from $r_n$ 111. A tracking error $\epsilon_n$ 145 is calculated by subtracting $\hat{s}_{n-d}$ 131 from $\tilde{s}_{n-d}$ 144, where d is a delay introduced by the coherent decoder 130. Then, a phase correction factor due to frequency error, $\tilde{\theta}'_n$ 147, and a phase reference estimate, $\tilde{\theta}_n$ 148, are updated with the well-known gradient method:

$$\tilde{\theta}'_n = \tilde{\theta}'_{n-1} + \beta\epsilon_n, \quad \text{Eq. (2a)}$$

$$\tilde{\theta}_n = \tilde{\theta}_{n-1} + \alpha\epsilon_n + \tilde{\theta}'_n, \quad \text{Eq. (2b)}$$

where $0 \leq \alpha \leq 1$ and $0 \leq \beta \leq 1$. Note that $\tilde{\theta}'_n$ 147 is a phase-error correction factor based on an estimated frequency-offset between the TX and the RX. Such a phase tracking loop is traditionally known as a second order phase-locked-loop (PLL). This tracking scheme can be easily generalized to a third order PLL as follows:

$$\tilde{\theta}''_n = \tilde{\theta}''_{n-1} + \gamma\epsilon_n, \quad \text{Eq. (3a)}$$

$$\tilde{\theta}'_n = \tilde{\theta}'_{n-1} + \beta\epsilon_n + \tilde{\theta}''_n, \quad \text{Eq. (3b)}$$

$$\tilde{\theta}_n = \tilde{\theta}_{n-1} + \alpha\epsilon_n + \tilde{\theta}'_n, \quad \text{Eq. (3c)}$$

where $0 \leq \alpha \leq 1$, $0 \leq \beta \leq 1$ and $0 \leq \gamma \leq 1$. In the same manner, this tracking can be further generalized to an n-th order PLL. Note that this 3-rd order PLL can track not only static frequency errors but also time-varying frequency errors.

Note that the above n-th order phase reference tracking algorithm may be applied to any phase-modulated signals. In general, the inputs of the phase reference tracking unit 120 are the received phase $r_n$ 111 and the re-modulation phase signal $\hat{s}_{n-d}$ 131. The output of the phase reference tracking unit 120 is the estimated transmit phase $\tilde{s}_n$ 141, after proper phase/frequency error correction, at the receiver. If required, the overall block diagram may be re-organized to save computational power and/or hardware size.

For clearer explanations, consider an M-ary PSK signal. In the transmitter (TX), k (=$\log_2$ M) information bits are mapped to one of the M phases. Let $a_n$ and $s_n$ be the n-th symbol with k information bits and its corresponding mapped phase, respectively. This, the transmit phase, $s_n$ may be represented as $$s_n = \mathcal{M}(a_n), n=0, 1, \ldots, M-1, \quad \text{Eq. (4)}$$

where $\mathcal{M}(\bullet)$ denotes the phase-mapping function. Note the phase mapping for M=2 is shown in TABLE 2. In the proposed MPSK receiver (RX) shown in FIG. 2, the phase of a received phase $r_n$ 111 may be represented as $$r_n = s_n + \theta_n, \quad \text{Eq. (5)}$$

where $\theta_n$ is the phase mismatching caused by the phase mismatching between the TX and the RX. The proposed second order PLL for decoding $s_n$ and tracking $\theta_n$ for a received MPSK signal is as follows:

Decoding/Phase-Tracking algorithm for MPSK signals (FIG. 2)
For n=0 to N−1

$$\tilde{s}_n = r_n - \tilde{\theta}_{n-1} \qquad \text{Eq. (6a)}$$

$$\hat{a}_n = \mathcal{M}^{-1}(\tilde{s}_n) \qquad \text{Eq. (6b)}$$

$$\hat{s}_n = \mathcal{M}(\hat{a}_n) \qquad \text{Eq. (6c)}$$

$$\epsilon_n = \tilde{s}_n - \hat{s}_n \qquad \text{Eq. (6d)}$$

$$\hat{\theta}'_n = \hat{\theta}'_{n-1} + \beta \epsilon_n \qquad \text{Eq. (6e)}$$

$$\tilde{\theta}_n = \tilde{\theta}_{n-1} + \alpha \epsilon_n + \hat{\theta}'_n \qquad \text{Eq. (6f)}$$

An PSK coherent decoder 210 comprises a de-mapping unit and a mapping unit. The function $\mathcal{M}^{-1}(\bullet)$ is the de-mapping unit 213, i.e., the inverse function of $\mathcal{M}(\bullet)$. This de-mapping unit is for decoding an MPSK signal to produce a decoded symbol $\hat{a}_n$ 212. This decoded symbol $\hat{a}_n$ 212 is mapped again to generate a re-modulation phase signal $\hat{s}_n$ 149 with the mapping unit 211. Note an example de-mapping table is given in TABLE 1 and the corresponding mapping table is given in TABLE 2 for a BPSK modulated signal.

Inside the phase reference tracking unit 220, the n-th estimated transmit phase $\tilde{s}_n$ 141, is calculated by subtracting the previous phase reference estimate $\tilde{\theta}_{n-1}$ 142 from $r_n$ 111. Initial phase reference $\tilde{\theta}_{-1}$ is assumed to be estimated with the help of a training sequence which is known to both TX and RX. Even if this initial phase reference $\tilde{\theta}_{-1}$ is well-estimated, this reference may be further tracked for better Rx performance. Moreover, this invention may help to track phase reference with the phase variations during receiving due to imperfection in the Tx or the Rx path.

Then, an error $\epsilon_n$ 145 is calculated by subtracting $\hat{s}_n$ 149 from $\tilde{s}_n$ 141. Note that $\epsilon_n$ 145 tends to be smaller with a more accurate $\tilde{\theta}_{n-1}$ 142. A phase correction factor due to FO between the TX and the RX, $\hat{\theta}'_n$ 147, is obtained with $\epsilon_n$ 145 and $\beta$ 146 from the previous estimate $\hat{\theta}'_{n-1}$. Note: Units 125 and 129 represent "sample delays" and the circuitry shown in 220 implements Eq. (6e). The initial estimate $\tilde{\theta}'_1$ may be set to zero or previous estimate based on a training sequence. Finally, a phase reference estimate $\tilde{\theta}_n$ 148 is updated with $\epsilon_n$ 145, $\alpha$ 143 and $\hat{\theta}'_n$ 147 from $\tilde{\theta}_{n-1}$ 142 using Eq. (6f). This process shall be repeated until every symbol is decoded.

This invention can be also applied to DPSK signals. DPSK signals are popular for many communication systems due to the simple non-coherent detections even though coherent detections outperform non-coherent detections by up to 3 dB. Those non-coherent detection losses may be reduced by reliable phase reference tracking.

U.S. Pat. No. 7,245,672 disclosed the so-called 'semi-coherent demodulation for DPSK signals' (FIG. 3) which is similar to the phase tracking algorithm for PSK signals with a first-order PLL, but his algorithm does not track the higher-order phase variations. Moreover, the phase error measurement is based on the transmit phase constellations. That means, the phase error measurement may be not as reliable as that of the present invention (shown later) since the number of constellations may be larger than M for M-ary DPSK. For example, Bluetooth adopts π/4 DQPSK of which number of constellations is not four, but eight. Another disadvantage of the algorithm is that single error in PSK decoder (unit 310) causes double errors after differential decoding (shown later). Smit's decoding algorithm for DPSK signals (FIG. 3)
For n=0 to N−1

$$\tilde{s}_n = r_n - \tilde{\theta}_{n-1} \qquad \text{Eq. (7a)}$$

$$\hat{s}_n = \mathcal{H}_D(\tilde{s}_n) \qquad \text{Eq. (7b)}$$

$$\epsilon_n = \tilde{s}_n - \hat{s}_n \qquad \text{Eq. (7c)}$$

$$\tilde{\theta}_n = \tilde{\theta}_{n-1} + \alpha \epsilon_n \qquad \text{Eq. (7d)}$$

$$\hat{a}_n = \mathcal{M}^{-1}(\hat{s}_n - \hat{s}_{n-1}) \qquad \text{Eq. (7e)}$$

where $\mathcal{H}_D(a)$ is a function that gives out the phase of the closest constellation to a. For π/4 DQPSK, the number of the possible $\hat{s}_n$ 149 values is eight, not four due to the π/4 shifting. In this case, a less reliable phase error estimate, $\epsilon_n$ 145, is generated per Eq. (7c). A PSK decoder unit 310 decodes a PSK signal with the first-order PLL in phase-domain, generating the re-modulation phase signal $\hat{s}_n$ 149. Then, a differential decoder unit 320 differentially the re-modulation phase signal $\hat{s}_n$ 149, generating $\hat{a}_n$ 212. Due to the differential decoding in Eq. (7e), single error in $\hat{s}_n$ 149 causes double errors in $\hat{a}_n$ 212 for a DPSK signal.

Here, we propose a method for a DPSK signal to overcome the disadvantages of the prior invention such as the first-order PLL tracking limitation, unreliable phase error estimate for π/4 DQPSK, and the double errors. Let's consider an M-ary DPSK signal similar to a MPSK signal. In the TX, k (=log₂ M) information bits are mapped to one of the M phases. Let $a_n$ and $x_n$ be the n-th symbol with k information bits and its corresponding mapped phase, respectively. This phase, $x_n$ may be represented as $$x_n = \mathcal{M}(a_n), n=0, 1, \ldots, N-1. \qquad \text{Eq. (8)}$$

Those mapped phases are accumulated before transmitting. In the RX, the phase of the received phase $r_n$ 111 may be represented as $$r_n = s_n + \theta_n, \text{ where } s_n = \sum_{m=0}^{n} x_n \qquad \text{Eq. (9)}$$

where $\theta_n$ is the phase mismatching between the TX and the RX as previous explained. The proposed algorithm of $\theta_n$ estimation for DPSK is as follows:

A Phase Tracking and Decoding algorithm for DPSK Signals (FIG. 4)
For n=1 to N−1

$$\tilde{s}_n = r_n - \tilde{\theta}_{n-1} \qquad \text{Eq. (10a)}$$

$$\tilde{x}_n = \tilde{s}_n - \hat{s}_{n-1} \qquad \text{Eq. (10b)}$$

$$\hat{a}_n = \mathcal{M}^{-1}(\tilde{x}_n) \qquad \text{Eq. (10c)}$$

$$\hat{x}_n = \mathcal{M}(\hat{a}_n) \qquad \text{Eq. (10d)}$$

$$\hat{s}_n = \hat{s}_{n-1} + \hat{x}_n \qquad \text{Eq. (10e)}$$

$$\epsilon_n = \tilde{s}_n - \hat{s}_n \qquad \text{Eq. (10f)}$$

$$\hat{\theta}'_n = \hat{\theta}'_{n-1} + \beta \epsilon_n \qquad \text{Eq. (10g)}$$

$$\tilde{\theta}_n = \tilde{\theta}_{n-1} + \alpha \epsilon_n + \hat{\theta}'_n \qquad \text{Eq. (10h)}$$

This algorithm is similar to that for MPSK signals except the coherent decoder 410. Because the mapped phase $x_n$ is accumulated in the TX, $\hat{s}_{n-1}$ is subtracted from $\tilde{s}_n$ 141 before de-mapping, as is shown in Eq. (10b) and illustrated in coherent decoder 410. The initial phase reference $\tilde{\theta}_0$ may be set to $r_0$ or a previous estimate. The other initial estimate $\tilde{\theta}'_0$ may be set to zero or a previous estimate.

This algorithm can be re-written without $\tilde{s}_n$ 141 and $\hat{s}_n$ 149 as follows:

An Alternative implementation of phase-tracking and decoding algorithm for DPSK Signals
For n=1 to N−1

$$\tilde{x}_n = r_n - \sum_{m=1}^{n-1} \hat{x}_m - \tilde{\theta}_{n-1} \quad \text{Eq. (11a)}$$

$$\hat{a}_n = \mathcal{M}^{-1}(\tilde{x}_n) \quad \text{Eq. (11b)}$$

$$\hat{x}_n = \mathcal{M}(\hat{a}_n) \quad \text{Eq. (11c)}$$

$$\varepsilon_n = \tilde{x}_n - \hat{x}_n \quad \text{Eq. (11d)}$$

$$\tilde{\theta}'_n = \tilde{\theta}'_{n-1} + \beta \varepsilon_n \quad \text{Eq. (11e)}$$

$$\tilde{\theta}_n = \tilde{\theta}_{n-1} + \alpha \varepsilon_n + \tilde{\theta}'_n \quad \text{Eq. (11f)}$$

The algorithm for DPSK signals is further simplified by introducing $\tilde{\phi}_n$. Let $$\tilde{\phi}_n = \sum_{m=0}^{n} \hat{x}_m + \tilde{\theta}_n. \quad \text{Eq. (12)}$$

Then, $$\tilde{x}_n = r_n - \tilde{\phi}_{n-1}, \quad \text{Eq. (13)}$$

Since $\tilde{\theta}_n = \tilde{\theta}_{n-1} + \alpha \varepsilon_n + \tilde{f}_n$, $\phi_n$ can be derived as follows:

$$\tilde{\phi}_n = \sum_{m=0}^{n} \hat{x}_m + \tilde{\theta}_{n-1} + \alpha \cdot \varepsilon_n + \tilde{f}_n \quad \text{Eq. (14)}$$

$$= \hat{x}_n + \sum_{m=0}^{n-1} \hat{x}_m + \tilde{\theta}_{n-1} + \alpha \cdot \varepsilon_n + \tilde{f}_n$$

$$= \hat{x}_n + \tilde{\phi}_{n-1} + \alpha \cdot \varepsilon_n + \tilde{f}_n$$

$$= \tilde{x}_n - \varepsilon_n + \tilde{\phi}_{n-1} + \alpha \cdot \varepsilon_n + \tilde{f}_n$$

$$= r_n - (1-\alpha) \cdot \varepsilon_n + \tilde{f}_n$$

Therefore, the algorithm for DPSK signals may be written as follows:
An Alternative Algorithm for Phase-Tracking and Decoding of DPSK Signals (FIG. 5)
For n=1 to N−1

$$\tilde{x}_n = r_n - \tilde{\phi}_{n-1} \quad \text{Eq. (15a)}$$

$$\hat{a}_n = \mathcal{M}^{-1}(\tilde{x}_n) \quad \text{Eq. (15b)}$$

$$\hat{x}_n = \mathcal{M}(\hat{a}_n) \quad \text{Eq. (15c)}$$

$$\epsilon_n = \tilde{x}_n - \hat{x}_n \quad \text{Eq. (15d)}$$

$$\tilde{\theta}'_n = \tilde{\theta}'_{n-1} + \beta \epsilon_n \quad \text{Eq. (15e)}$$

$$\tilde{\phi}_n = r_n - (1-\alpha) \cdot \epsilon_n + \tilde{\theta}'_n \quad \text{Eq. (15f)}$$

FIG. 5 shows the corresponding implementation, compared to the previous algorithm, accumulation of $\hat{x}_n$ 414 is no longer required in this algorithm. In addition, this algorithm becomes the commonly used non-coherent detection when setting $\alpha=1$ and $\beta=\tilde{\theta}'_0=0$. As shown in this alternative algorithm for DPSK signals, the phase reference tracking unit 120 and coherent decoder 130 may be combined to save computation power and/or hardware size by sharing units and/or re-organizing units.

This DPSK phase-tracking and decoding algorithm is simpler than the Smit's algorithm if a higher-order PLL for phase-tracking is disabled. Moreover, this is more robust for π/4 DPSK signals than the Smit's because the hard-decisional error probability is smaller with a greater distance among a four-phase constellation set than an eight-phase constellation set. In Smit's algorithm, $\hat{s}_n$ 149 is set to the closest constellation from $\tilde{s}_n$ 141 (Eq. (7b)). Since the number of constellations is eight, the minimum phase distance among constellations is only π/4. For the current invention, the minimum phase distance to decide $\hat{x}_n$ 414 is π/2. Note that this algorithm is also good for heavy phase variations caused by frequency errors thanks to the higher order tracking. The double errors are also avoidable with this invention. Current error in $\hat{a}_n$ 212 may cause phase tracking degraded but not necessarily cause the next symbol error. In Smit's, an error in $\hat{s}_n$ 149 causes double errors for sure with a DPSK signal which is not shifted. Note that single error is still possible with Smit's for a π/4 shifted DQPSK signal.

Even though the proposed algorithm shown in the above are all 1st or 2nd order PLL's, one can easily generalize it to a 3rd order PLL as follows:
For n=1 to N−1

$$\tilde{x}_n = r_n - \tilde{\phi}_{n-1} \quad \text{Eq. (16a)}$$

$$\hat{a}_n = \mathcal{M}^{-1}(\tilde{x}_n) \quad \text{Eq. (16b)}$$

$$\hat{x}_n = \mathcal{M}(\hat{a}_n) \quad \text{Eq. (16c)}$$

$$\epsilon_n = \tilde{x}_n - \hat{x}_n \quad \text{Eq. (16d)}$$

$$\tilde{\theta}''_n = \tilde{\theta}''_{n-1} + \gamma \epsilon_n \text{ (where } 0 \le \gamma \le 1) \quad \text{Eq. (16e)}$$

$$\tilde{\theta}'_n = \tilde{\theta}'_{n-1} + \beta \epsilon_n + \tilde{\theta}''_n \quad \text{Eq. (16f)}$$

$$\tilde{\phi}_n = r_n - (1-\alpha) \cdot \epsilon_n + \tilde{\theta}'_n \quad \text{Eq. (16g)}$$

When compared to a 2nd order PLL as shown in Eq. (15), the only difference in the above is the addition of $\tilde{\theta}''_n$, which can be used to track the FO variations. For Bluetooth applications, one found the 3rd order PLL, proposed in the above, offers the best performance against dirty packets, for which a FO and a sine-wave based frequency variation are both added to the transmitted BT EDR packets.

What is claimed is:

1. A method used for phase reference tracking of digital phase modulated signals in the receiver, comprising the steps of:

converting a received complex signal to the received phase $r_n$;

feeding the received phase $r_n$ to a phase reference tracking unit;

producing an estimated transmit phase $\tilde{s}_n$ from the phase reference tracking unit;

feeding the estimated transmit phase $\tilde{s}_n$ to a coherent decoder; and producing a decoded symbol $\hat{a}_n$ from the coherent decoder, wherein the procedure of producing an estimated transmit phase $\tilde{s}_n$ further comprising the steps of:

subtracting a previous phase reference estimate $\tilde{\theta}_{n-1}$ from a received phase $r_n$;

producing a tracking error $\epsilon_n$ by subtracting a re-modulation phase signal $\hat{s}_n$ from an estimated transmit phase $\tilde{s}_n$;

scaling the tracking error $\epsilon_n$ by a value of $\beta$;

adding the scaled of tracking error $\beta\epsilon_n$ with a previous phase correction factor $\tilde{\theta}'_{n-1}$ and derive a phase correction factor $\tilde{\theta}'_n$;

scaling the tracking error $\epsilon_n$ by a value of $\alpha$;

adding the scaled of tracking error $\alpha\epsilon_n$ with the phase correction factor $\tilde{\theta}'_n$; and adding the scaled of tracking error $\alpha\epsilon_n$ with the phase correction factor $\tilde{\theta}'_n$ with the previous phase reference estimate $\tilde{\theta}'_{n-1}$ and derive the phase reference estimate $\tilde{\theta}_n$.

2. A method used for phase reference tracking of digital phase modulated signals in the receiver as claimed in claim 1, wherein the received complex signal can be encoded by BPSK (Binary Phase-Shift Keying), MPSK (M-ary Binary Phase-Shift Keying), PSK (Phase-Shift Keying), DPSK (Differential Binary Phase-Shift Keying) modulation systems.

3. A method used for phase reference tracking of digital phase modulated signals in the receiver as claimed in claim 1, wherein the method is generalized with n-th order tracking.

4. A method used for phase reference tracking of digital phase modulated signals in the receiver, comprising the steps of:

converting a received complex signal to the received phase $r_n$;

feeding the received phase $r_n$ to a phase reference tracking unit;

producing an estimated transmit phase $\tilde{s}_n$ from the phase reference tracking unit;

feeding the estimated transmit phase $\tilde{s}_n$ to a coherent decoder; and producing symbol $\hat{a}_n$ from the coherent decoder, wherein the procedure of producing an estimated transmit phase $\tilde{s}_n$ further comprising the steps of:

subtracting a previous phase reference estimate $\tilde{\theta}_{n-1}$ from a received phase $r_n$;

adding a delay (d) to an estimated transmit phase $\tilde{s}_n$;

producing a tracking error $\epsilon_n$ by subtracting a re-modulation phase with a delay (d)$\hat{s}_{n-d}$ from a re-modulation phase with a delay (d)$\hat{s}_{n-d}$;

scaling the tracking error $\epsilon_n$ by a value of $\beta$;

adding the scaled of tracking error $\beta\epsilon_n$ with a previous phase correction factor $\tilde{\theta}'_{n-1}$ and derive a phase correction factor $\tilde{\theta}'_n$;

scaling the tracking error $\epsilon_n$ by a value of $\alpha$;

adding the scaled of tracking error $\alpha\epsilon_n$ with the phase correction factor $\tilde{\theta}'_n$; and adding the scaled of tracking error $\alpha\epsilon_n$, with the phase correction factor $\tilde{\theta}'_n$ with the previous phase reference estimate $\tilde{\theta}'_{n-1}$ and derive the phase reference estimate $\tilde{\theta}_n$;

wherein the delay (d) is used for generating the estimated transmit phase $\tilde{s}_n$ with correct timing.

5. A method used for phase reference tracking of digital phase modulated signals in the receiver as claimed in claim 4, wherein the received complex signal can be encoded by BPSK (Binary Phase-Shift Keying), MPSK (M-ary Binary Phase-Shift Keying), PSK (Phase-Shift Keying), DPSK (Differential Binary Phase-Shift Keying) modulation systems.

6. A method used for phase reference tracking of digital phase modulated signals in the receiver as claimed in claim 4, wherein the method is generalized with n-th order tracking.

7. A method used for phase reference tracking of digital phase modulated signals in the receiver, comprising the steps of:

converting a received complex signal to the received phase $r_n$;

feeding the received phase $r_n$ to a phase reference tracking unit;

producing an estimated transmit phase $\tilde{s}_n$ from the phase reference tracking unit;

feeding the estimated transmit phase $\tilde{s}_n$ to a coherent decoder; and producing a decoded symbol $\hat{a}_n$ from the coherent decoder, wherein the procedure of producing a decoded symbol $\hat{a}_n$ further comprising the steps of:

feeding an estimated transmit phase $\tilde{s}_n$ to a coherent decoder;

de-mapping the estimated transmit phase $\tilde{s}_n$;

producing a decoded symbol $\hat{a}_n$;

mapping the decoded symbol $\hat{a}_n$; and producing a re-modulation phase signal $\hat{s}_n$;

wherein the re-modulation phase signal $\hat{s}_n$ is feed to a phase reference tracking unit and used for the calculation of a tracking error $\epsilon_n$.

8. A method used for phase reference tracking of digital phase modulated signals in the receiver as claimed in claim 7, wherein the received complex signal can be encoded by BPSK (Binary Phase-Shift Keying), MPSK (M-ary Binary Phase-Shift Keying), PSK (Phase-Shift Keying), DPSK (Differential Binary Phase-Shift Keying) modulation systems.

9. A method used for phase reference tracking of digital phase modulated signals in the receiver as claimed in claim 7, wherein the method is generalized with n-th order tracking.

10. An apparatus used for phase reference tracking of digital phase modulated signals in the receiver, comprising:

a complex-to-phase converter, used for converting the in-phase ($I_n$) and the quadrature ($Q_n$) components of a received complex signal to a received phase $r_n$;

a phase reference tracking unit, electrically connected to the complex-to-phase converter, used for producing an estimated transmit phase $\tilde{s}_n$; and a coherent decoder, electrically connected to the phase reference tracking unit, used for producing a decoded symbol $\hat{a}_n$ and sending a re-modulation phase signal $\hat{s}_n$ to the phase reference tracking unit, wherein the phase reference tracking unit further comprising:

a first subtracter, used for subtracting the previous phase reference estimate $\tilde{\theta}_{n-1}$ from the received phase $r_n$ and producing the estimated transmit phase $\tilde{s}_n$;

a second subtracter, electrically connected to the coherent decoder, used for subtracting the a re-modulation phase signal $\hat{s}_n$ from the estimated transmit phase $\tilde{s}_n$ and producing a tracking error $\epsilon_n$;

a first multiplier, electrically connected to the second subtracter, used for scaling the tracking error $\epsilon_n$ by a value of $\beta$;

a first adder, electrically connected to the first multiplier, used for adding a scaled tracking error $\beta\epsilon_n$ and a previous phase correction factor $\tilde{\theta}'_{n-1}$;

a first sample delay unit, electrically connected to the first adder, used for the taking the phase correction factor $\tilde{\theta}'_n$ to the previous state of $\tilde{\theta}'_{n-1}$ and providing a feedback signal of previous phase correction factor $\tilde{\theta}'_{n-1}$ to the first adder;

a second multiplier, electrically connected to the second subtracter, used for scaling the tracking error $\epsilon_n$ by a value of $\alpha$;

a second adder, electrically connected to the second multiplier, used for adding a scaled tracking error $\alpha\epsilon_n$ and the phase correction factor $\tilde{\theta}'_n$;

a third adder, electrically connected to the second adder, used for adding the previous phase reference estimate $\tilde{\theta}_{n-1}$, the scaled tracking error $\alpha\epsilon_n$ and the phase correction factor $\tilde{\theta}'_n$; and a second sample delay unit, electrically connected to the second adder, used for the taking the phase reference estimate $\tilde{\theta}_n$ to the previous state $\tilde{\theta}_{n-1}$ and providing a feedback signal of previous reference estimate $\tilde{\theta}_{n-1}$ to the third adder and the first subtracter.

11. An apparatus used for phase reference tracking of digital phase modulated signals in the receiver as claimed in claim 10, wherein the apparatus used for phase reference tracking of digital phase modulated signals in the receiver can be applied in BPSK (Binary Phase-Shift Keying), MPSK (M-ary Binary Phase-Shift Keying), PSK (Phase-Shift Keying), DPSK (Differential Binary Phase-Shift Keying) modulation systems.

12. An apparatus used for phase reference tracking of digital phase modulated signals in the receiver as claimed in claim 10, wherein the received complex signal can be encoded by BPSK (Binary Phase-Shift Keying), MPSK (M-ary Binary Phase-Shift Keying), PSK (Phase-Shift Keying), DPSK (Differential Binary Phase-Shift Keying) modulation systems.

13. An apparatus used for phase reference tracking of digital phase modulated signals in the receiver as claimed in claim 10, wherein the received phase $r_n$ can be converted to different forms according the received complex signal.

14. An apparatus used for phase reference tracking of digital phase modulated signals in the receiver as claimed in claim 10, wherein the types of the coherent decoder can be selected according to BPSK (Binary Phase-Shift Keying), MPSK (M-ary Binary Phase-Shift Keying) and DPSK (Differential Binary Phase-Shift Keying) modulation systems.

15. An apparatus used for phase reference tracking of digital phase modulated signals as claimed in claim 10, wherein the phase reference tracking unit tracks phase with a second-order phase-locked-loop.

16. An apparatus used for phase reference tracking of digital phase modulated signals as claimed in claim 10, wherein the phase tracking unit is generalized with n-th order tracking by adding the order of phase-locked-loop.

17. An apparatus used for phase reference tracking of digital phase modulated signals as claimed in claim 10, wherein the construction of the block diagram of the apparatus may be modified and/or simplified with combining the phase reference tracking units and the coherent decoder units by removing redundant units and/or re-organizing the block diagrams.

18. An apparatus used for phase reference tracking of digital phase modulated signals in the receiver, comprising:

a complex-to-phase converter, used for converting the in-phase ($I_n$) and the quadrature ($Q_n$) components of a received complex signal to a received phase $r_n$;

a phase reference tracking unit, electrically connected to the complex-to-phase converter, used for producing an estimated transmit phase $\tilde{s}_n$; and a coherent decoder, electrically connected to the phase reference tracking unit, used for producing a decoded symbol $\hat{a}_n$ and sending a phase singal $\hat{s}_n$ to the phase reference tracking unit, wherein the phase reference tracking unit further comprising:

a first subtracter, used for subtracting the previous phase reference estimate $\tilde{\theta}_{n-1}$ from the received phase $r_n$ and producing the estimated transmit phase $\tilde{s}_n$;

a coherent decoder, electrically connected to the first subtracter, used for compensating the delay (d) caused in the coherent decoder and generating the estimated transmit phase $\tilde{s}_n$ with correct timing;

a second subtracter, electrically connected to the coherent decoder, used for subtracting the a re-modulation phase signal with a delay (d) $\hat{s}_{n-d}$ the estimated transmit phase with a delay (d) $\tilde{s}_{n-d}$ and producing a tracking error $\epsilon_n$;

a first adder, electrically connected to the first multiplier, used for adding a scaled tracking error $\beta\epsilon_n$ and a previous phase correction factor $\tilde{\theta}'_{n-1}$;

a first sample delay unit, electrically connected to the first adder, used for the taking the phase correction factor $\tilde{\theta}'_n$ to the previous state of $\tilde{\theta}'_{n-1}$ and providing a feedback signal of previous phase correction factor $\tilde{\theta}'_{n-1}$ it the first adder;

a second multiplier, electrically connected to the second subtracter, used for scaling the tracking error $\epsilon_n$ by a value of $\alpha$;

a second adder, electrically connected to the second multiplier, used for adding a scaled tracking error $\alpha\epsilon_n$ and the phase correction factor $\tilde{\theta}'_n$;

a third adder, electrically connected to the second adder, used for adding the previous phase reference estimate $\tilde{\theta}_{n-1}$, the scaled tracking error $\alpha\epsilon_n$ and the phase correction factor $\tilde{\theta}'_n$; and a second sample delay unit, electrically connected to the second adder, used for the taking the phase reference estimate $\tilde{\theta}_n$ to the previous state $\tilde{\theta}_{n-1}$ and providing a feedback signal of previous reference estimate $\tilde{\theta}_{n-1}$ to the third adder and the first subtracter;

wherein the delay (d) of estimated transmit phase $\tilde{s}_n$ is caused by the coherent decoder and results an estimated transmit phase with a delay (d) $\tilde{s}_{n-d}$.

19. An apparatus used for phase reference tracking of digital phase modulated signals in the receiver as claimed in claim 18, wherein the apparatus used for phase reference tracking of digital phase modulated signals in the receiver can be applied in BPSK (Binary Phase-Shift Keying), MPSK (M-ary Binary Phase-Shift Keying), PSK (Phase-Shift Keying), DPSK (Differential Binary Phase-Shift Keying) modulation systems.

20. An apparatus used for phase reference tracking of digital phase modulated signals in the receiver as claimed in claim 18, wherein the received complex signal can be encoded by BPSK, MPSK, PSK and DPSK modulation systems.

21. An apparatus used for phase reference tracking of digital phase modulated signals in the receiver as claimed in claim 18, wherein the types of the coherent decoder can be selected according to BPSK (Binary Phase-Shift Keying), MPSK (M-ary Binary Phase-Shift Keying) and DPSK (Differential Binary Phase-Shift Keying) modulation systems.

22. An apparatus used for phase reference tracking of digital phase modulated signals as claimed in claim 18, wherein the phase reference tracking unit tracks phase with a second-order phase-locked-loop.

23. An apparatus used for phase reference tracking of digital phase modulated signals as claimed in claim 18, wherein the phase tracking unit is generalized with n-th order tracking by adding the order of phase-locked-loop.

24. An apparatus used for phase reference tracking of digital phase modulated signals as claimed in claim 18, wherein the construction of the block diagram of the apparatus may be modified and/or simplified with combining the phase reference tracking units and the coherent decoder units by removing redundant units and/or re-organizing the block diagrams.

* * * * *